United States Patent [19]
August

[11] Patent Number: 6,056,888
[45] Date of Patent: May 2, 2000

[54] ELECTRONIC COMPONENT AND METHOD OF MANUFACTURE

[75] Inventor: Richard J. August, Scottsdale, Ariz.

[73] Assignee: Motorola, Inc., Schaumburg, Ill.

[21] Appl. No.: 09/294,075

[22] Filed: Apr. 19, 1999

[51] Int. Cl.⁷ .................................................... H01B 13/00
[52] U.S. Cl. ............................................... 216/16; 338/42
[58] Field of Search ................................ 216/16; 338/42

[56] References Cited

U.S. PATENT DOCUMENTS

| | | |
|---|---|---|
| 4,125,820 | 11/1978 | Marshall . |
| 4,838,088 | 6/1989 | Murakami . |
| 4,996,082 | 2/1991 | Guckel et al. .............................. 427/99 |
| 5,178,016 | 1/1993 | Dauenhauer et al. . |
| 5,493,470 | 2/1996 | Zavracky et al. . |
| 5,702,619 | 12/1997 | Kurtz et al. ................................... 216/2 |
| 5,747,705 | 5/1998 | Herb et al. ............................ 73/862.59 |
| 6,006,607 | 12/1999 | Bryzek et al. ............................. 73/727 |

*Primary Examiner*—Randy Gulakowski
*Assistant Examiner*—Allan Olsen
*Attorney, Agent, or Firm*—A. Kate Huffman

[57] ABSTRACT

An electronic component includes a substrate (201) with a surface (202), a resistor structure (210) supported by the substrate, and a passivation layer (300, 805) over the resistor and the surface of the substrate where the passivation layer has a hole (311, 312, 611, 612, 613, 614, 711, 811), where the surface of the substrate has a compressive portion and a tensile portion, and where the resistor is located between the compressive and tensile portions of the surface.

21 Claims, 5 Drawing Sheets

ELECTRONIC COMPONENT AND METHOD OF MANUFACTURE

BACKGROUND OF THE INVENTION

This invention relates, in general, to electronics, and more particularly, to electronic components and methods of manufacture.

Electronic components such as piezoresistive pressure sensors typically have passivation films overlying a thin pressure-sensitive diaphragm. While these piezoresistive pressure sensors are used in a wide variety of applications, these sensors still have many sources of error that degrade sensor accuracy. For instance, piezoresistive pressure sensors have thermal hysteresis errors, which can be caused by the thermal hysteresis of stresses within the passivation films. The thermal hysteresis errors are especially troublesome because they cannot be corrected by using additional circuitry. Furthermore, as another example, piezoresistive pressure sensors also suffer from temperature coefficient of offset errors, which can also be caused by the changes in film stress over temperature within the passivation films.

One technique to reduce the detrimental effects of film stress is to improve the quality of the passivation film to eliminate the amount of film stress and its variation with temperature. However, this improvement is both difficult and expensive to implement because many of the sources of stress hysteresis are not known.

Accordingly, a need exists for a manufacturable and cost-effective piezoresistive pressure sensor that is insensitive, or at least less sensitive, to thermal hysteresis errors and temperature coefficient of offset errors due to film stresses. A need also exists for a manufacturable and cost-effective method of manufacturing the piezoresistive pressure sensor.

Figure 1:
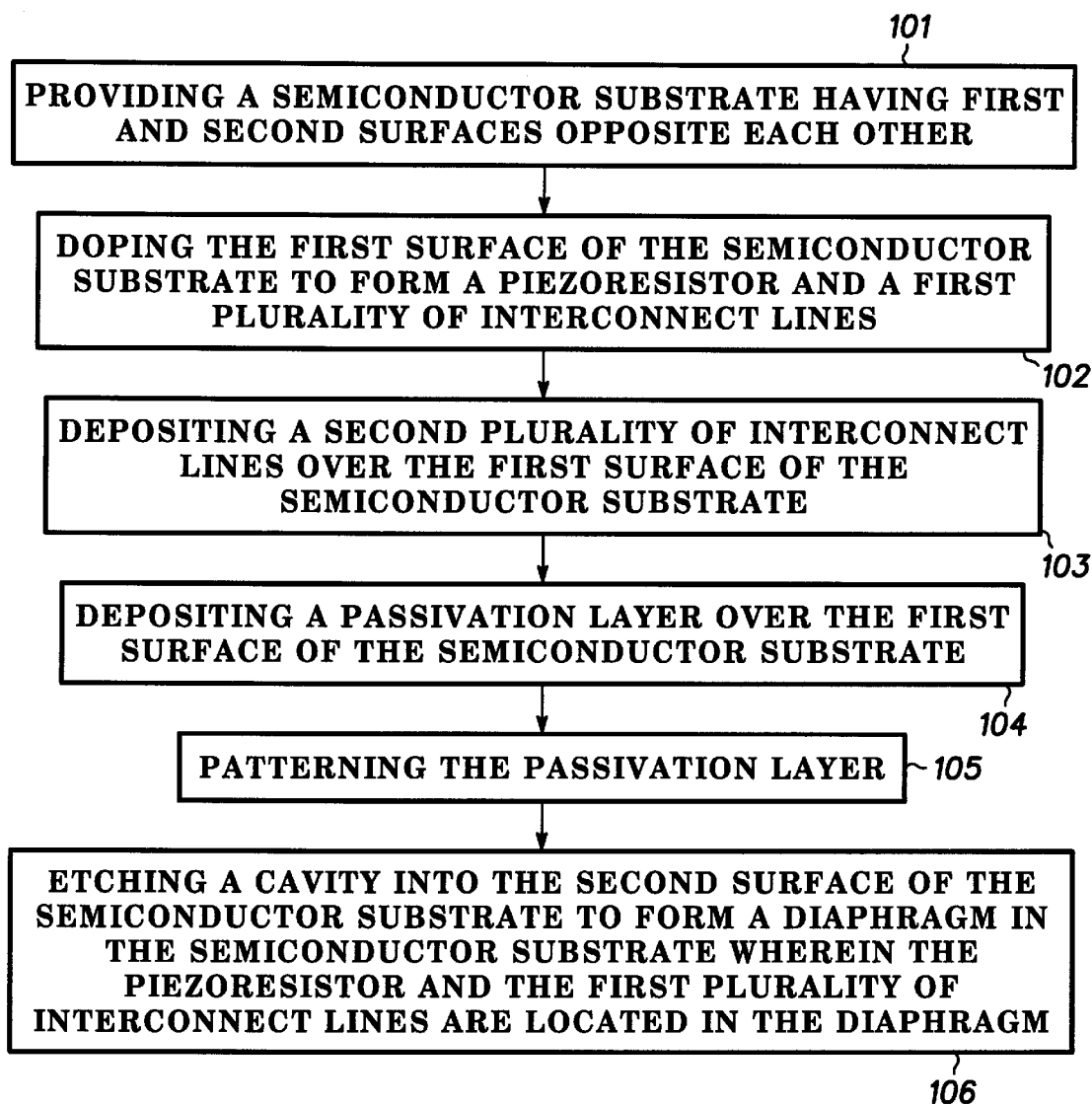
FIG. 1 outlines a method of manufacturing an electronic component in accordance with the present invention.

For simplicity and clarity of illustration, elements in the drawings are not necessarily drawn to scale, and the same reference numerals in different figures denote the same elements. Additionally, descriptions and details of well-known features and processing techniques are omitted to avoid unnecessarily obscuring the present invention.

DETAILED DESCRIPTION OF THE DRAWINGS

FIG. 1 outlines a method 100 of manufacturing an electronic component. Method 100 includes several steps in the following sequence. Method 100 has a step 101 for providing a semiconductor substrate having first and second surfaces opposite each other. Method 100 continues with a step 102 for doping the first surface of the semiconductor substrate to form a piezoresistor or a piezoresistive network and a first plurality of interconnect lines. Next, method 100 proceeds with a step 103 for depositing or otherwise disposing a second plurality of interconnect lines over the first surface of the semiconductor substrate. Then, method 100 includes a step 104 for depositing or otherwise disposing at least one passivation layer over the first surface of the semiconductor substrate, and a step 105 for patterning the passivation layer. Subsequently, a step 106 in method 100 is performed to etch or otherwise form a cavity into the second surface of the semiconductor substrate. This cavity formation creates a pressure-sensing diaphragm in the semiconductor substrate. The piezoresistor and the first plurality of interconnect lines are preferably located in the diaphragm. The relative positions, locations, or configurations of the cavity, the diaphragm, the pattern in the passivation layer, the piezoresistor, and the first and second plurality of interconnect lines are explained in more detail hereinafter.

Figure 2:
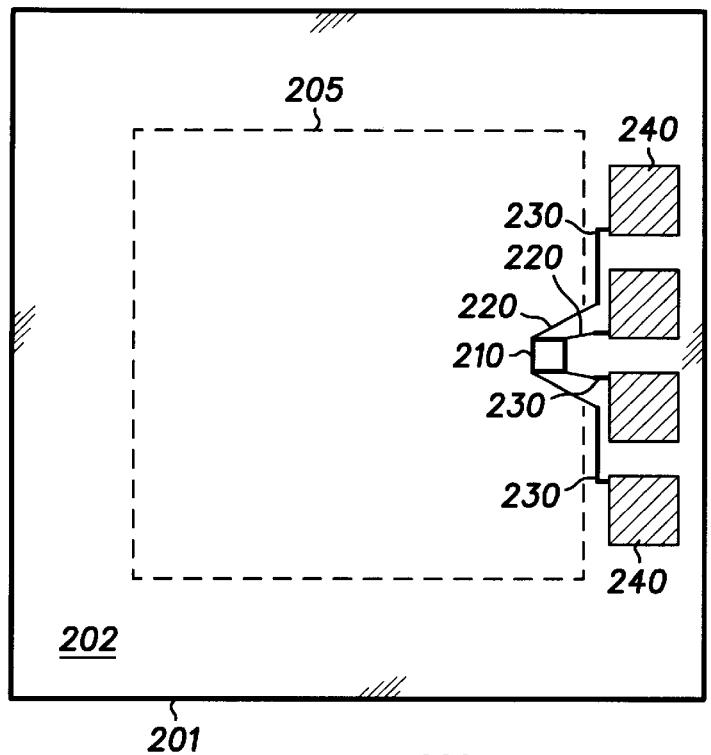
FIG. 2 illustrates a top view of an embodiment of an electronic component after an intermediate stage of manufacturing in accordance with the present invention.

FIG. 2 illustrates a top view of an electronic component 200 after an intermediate stage of manufacturing. In particular, FIG. 2 illustrates component 200 between steps 103 and 104 of method 100 in FIG. 1. Component 200 includes a substrate 201 having a surface 202. In the preferred embodiment, substrate 201 is comprised of a semiconductor such as, for example, silicon. The semiconductor substrate can include an epitaxial layer that forms surface 202, or the semiconductor substrate can be comprised of a semiconductor-on-insulator (SOI) substrate. In an alternative embodiment, substrate 201 can consist of a non-semiconductor material such as, for example glass.

Component 200 also includes a resistor structure 210 supported by substrate 201. In pressure sensors, the resistor is referred to as a piezoresistor, and the piezoresistor can be comprised of a network of individual stress-sensitive resistors. Resistor structure 210 is preferably formed by doping surface 202 of substrate 201. The dopant can be activated and diffused to form the desired configuration for resistor structure 210. In the embodiment illustrated in FIG. 2, resistor structure 210 has four individual resistors arranged in a localized Wheatstone Bridge configuration. As an alternative, especially where substrate 201 is not comprised of a semiconductor material, resistor structure 210 can be formed over surface 202 of substrate 201.

A plurality of interconnect lines 220 are supported by substrate 201 and are electrically coupled to resistor structure 210. Interconnect lines 220 are preferably formed by doping surface 202 of substrate 201. Also in the preferred embodiment, interconnect lines 220 are doped more heavily than resistor structure 210 and are also formed prior to resistor structure 210.

A plurality of interconnect lines 230 are formed over surface 202 of substrate 201. Preferably, interconnect lines 230 are comprised of a metal such as, for example, aluminum or copper, and are electrically coupled to interconnect lines 220. Interconnect lines 230 are also used to form at least a lower supporting portion of bonding pads 240. Pads 240 can be used for wire bonding, flip-chip bonding, tape-automated-bonding, or other similar interconnect technique.

A dashed line in FIG. 2 represents an edge, periphery, or perimeter 205 of a diaphragm or membrane that will be subsequently formed in a central portion of substrate 201 from the underside of substrate 201. The dashed line is illustrated in FIG. 2 to show the relative positions or locations between the diaphragm and resistor structure 210 and interconnect lines 220 and 230, which will be discussed in more detail hereinafter.

Figure 3:
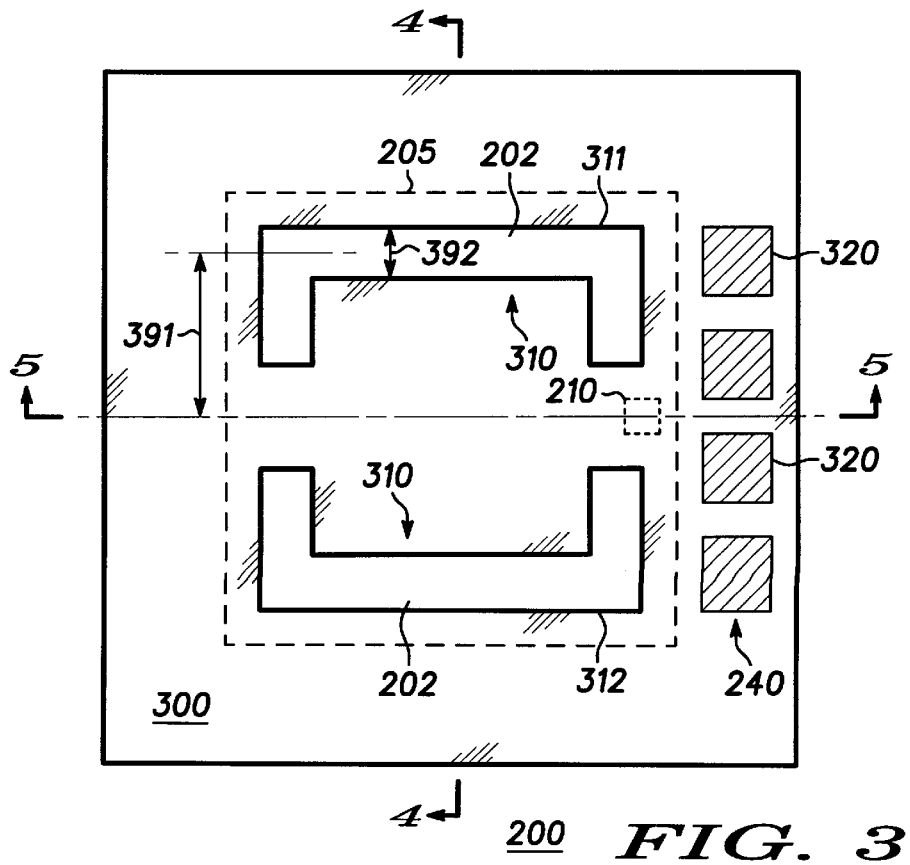
FIG. 3 illustrates a top view of an embodiment of the electronic component after a subsequent stage of manufacturing in accordance with the present invention.

FIG. 3 illustrates a top view of electronic component 200 after a subsequent stage of manufacturing. In particular, FIG. 3 illustrates component 200 after step 106 of method 100 in FIG. 1. A passivation layer 300 is formed over surface 202 of substrate 201 to cover resistor structure 210 (FIG. 2) and interconnect lines 220 and 230 (FIG. 2). Layer 300 protects the underlying structures. Layer 300 preferably physically contacts surface 202 of substrate 201 to minimize the total thickness of the composite pressure sensor diaphragm, which maximizes the pressure sensitivity of component 200. Also, passivation layer 300 is preferably comprised of a single dielectric layer or multiple dielectric layers or films such as, for example, silicon nitride or silicon oxide that is deposited by a chemical vapor deposition process, a thermal growth, process, or the like. However, layer 300 can also be comprised of other materials such as, for example, metals or semiconductors that are deposited by sputtering, evaporation, chemical vapor deposition, or the like.

Layer 300 is patterned to form at least one hole in layer 300. In component 200, a pattern 310 in layer 300 consists of two holes 311 and 312. In the preferred embodiment, the process of removing portions of layer 300 exposes portions of surface 202 of substrate 201 through holes 311 and 312. Other holes 320 are also formed in layer 300 to expose bonding pads 240, but holes 320 are not part of pattern 310.

Pattern 310 is formed such that layer 300 remains or is kept over resistor structure 210 and interconnect lines 220 and 230 (FIG. 2). Pattern 310 does not overlie resistor structure 210 or interconnect lines 220 and 230 in order to protect those structures. Additionally, pattern 310 does not separate layer 300 into separate noncontiguous portions. Instead, layer 300 remains as one continuous layer over surface 202 of substrate 201 after pattern 310 is formed.

A recess or cavity 401 (FIG. 4) is etched into the opposite or rear side of substrate 201 to create the pressure sensitive diaphragm or membrane in substrate 201. The cavity is preferably formed in substrate 201 after patterning layer 300 in order to reduce the likelihood of substrate fracture due to the increased fragility of the substrate after cavity formation. The cavity is illustrated in the subsequent drawings.

Figure 4:
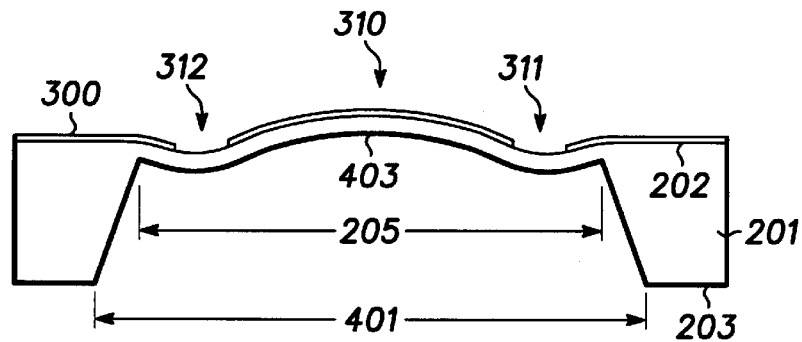
FIG. 4 illustrates a cross-sectional view of the electronic component taken along a section line 4—4 in FIG. 3 in accordance with the present invention.
Figure 5:
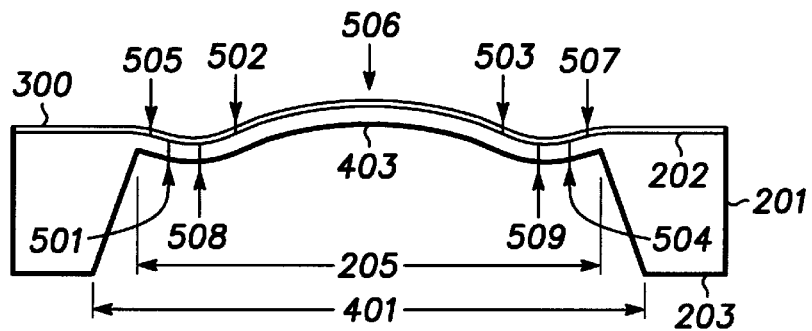
FIG. 5 illustrates a cross-sectional view of the electronic component taken along a section line 5—5 in FIG. 3 in accordance with the present invention.

FIG. 4 illustrates a cross-sectional view of electronic component 200 taken along a section line 4—4 in FIG. 3, and FIG. 5 illustrates a cross-sectional view of electronic component 200 taken along a section line 5—5 in FIG. 3. Cavity 401 is etched from a surface 203 of substrate 201 where surface 203 is opposite surface 202. Cavity 401 can be formed using conventional wet etchants that anisotropically etch along desired crystal planes in substrate 201.

The formation of cavity 401 creates a pressure sensitive membrane or diaphragm 403 in substrate 201. An etch stop layer in substrate 201 can be used to control the thickness of diaphragm 403. As an example, the etch stop layer can be an oxide layer if substrate 201 were an SOI substrate, or the etch stop layer can be a doped epitaxial layer if substrate 201 had an epitaxial layer forming surface 202 where the epitaxial layer had a different doping level compared to the lower portions of substrate 201.

Resistor structure 210 and interconnect lines 220 and 230 are not illustrated in FIG. 5 in order to avoid obscuring the description of the present invention. However, diaphragm 403 is formed such that resistor structure 210 and interconnect lines 220 are located in or over diaphragm 403 and such that pattern 310 is located over diaphragm 403 but is not located over at least one of the edges of diaphragm 403. Likewise, cavity 401 is located under resistor structure 210, interconnect lines 220, and pattern 310. To improve the reliability and electrical performance of component 200, interconnect lines 220 preferably extend beyond perimeter 205 of diaphragm 403 such that interconnect lines 230 and bonding pads 240 do not overlie or are absent over diaphragm 403.

During operation of component 200, pressure is applied to surface 202 of diaphragm 403 through layer 300, and diaphragm 403 deflects in response to the applied pressure. As diaphragm 403 is deflected, the resistance of each of the resistors in resistor structure 210 can change by different amounts depending upon the alignment of the individual resistors. To maximize the sensitivity of component 200 to the applied pressure, a central portion of an edge of diaphragm 403 is preferably located at or adjacent to resistor structure 210.

A transducer offset is measured in resistor structure 210 when no pressure is applied to diaphragm 403. As explained hereinafter, the manufacturing process of component 200 and the resulting configuration of component 200 aid in providing a preferred transducer offset of zero for a balanced Wheatstone Bridge configuration of resistor structure 210.

The intrinsic stresses in layer 300 produce the deformation or bending of diaphragm 403 and layer 300. However, pattern 310 in layer 300 is designed to control the deformation configuration. As illustrated in FIGS. 4 and 5, portions of surface 202 of diaphragm 403 have compressive stress while other portions of surface 202 have tensile stress. Still other portions of surface 202 have zero stress. These zero stress portions are located between the compressive and tensile portions and are called inflection portions. To achieve the illustrated deformation configuration of diaphragm 403, layer 300 is kept over the portion of perimeter 205 that is near the piezoresistor; pattern 310 in layer 300 is absent over the portion of perimeter 205 that is near the piezoresistor; and pattern 310 is near, but does not overlie, the piezoresistor.

As an example, in FIG. 5, surface 202 of diaphragm has inflection portions 501, 502, 503, and 504, tensile portions 505, 506, and 507, and compressive portions 508 and 509. To eliminate or at least minimize the sensitivity of component 200 to thermal hysteresis errors and temperature coefficient of offset errors, resistor structure 210 (FIG. 2) is preferably located at a central region of one of inflection portions 501, 502, 503, or 504. By locating resistor structure 210 at the stress inflection point between the compressive and tensile portions of surface 202, the intrinsic stresses or their variation over temperature will not degrade the electrical characteristics of component 200. In the embodiment illustrated in FIGS. 2–5, resistor structure 210 is located at inflection portion 504.

In the embodiment illustrated in FIGS. 2–5, diaphragm 403 has a thickness of approximately 10–30 micrometers, a width of approximately 0.5 to 3 millimeters, and a length of approximately 0.5 to 3 millimeters, and layer 300 has a thickness of approximately 0.1 to 2 micrometers. Also, hole 311 has a hole width 392 (FIG. 3) and a hole position 391 (FIG. 3), which is measured from a central portion of diaphragm 403. Holes 311 and 312 (FIGS. 3 and 4) are symmetric. Therefore, hole 312 has a position and width identical to that of hole 311, except that hole 312 is located at an opposite side of diaphragm 403. Also in this embodiment, resistor structure 210 is located at approximately 50–750 micrometers from the middle of the right-hand edge of perimeter 205 in FIG. 2. Computer simulations have demonstrated that an inflection point can be positioned at the location of resistor structure 210 when holes 311 and 312 have a position within the following ranges: a hole position of approximately 200–1400 micrometers and a hole width of approximately 20–750 micrometers.

Figure 6:
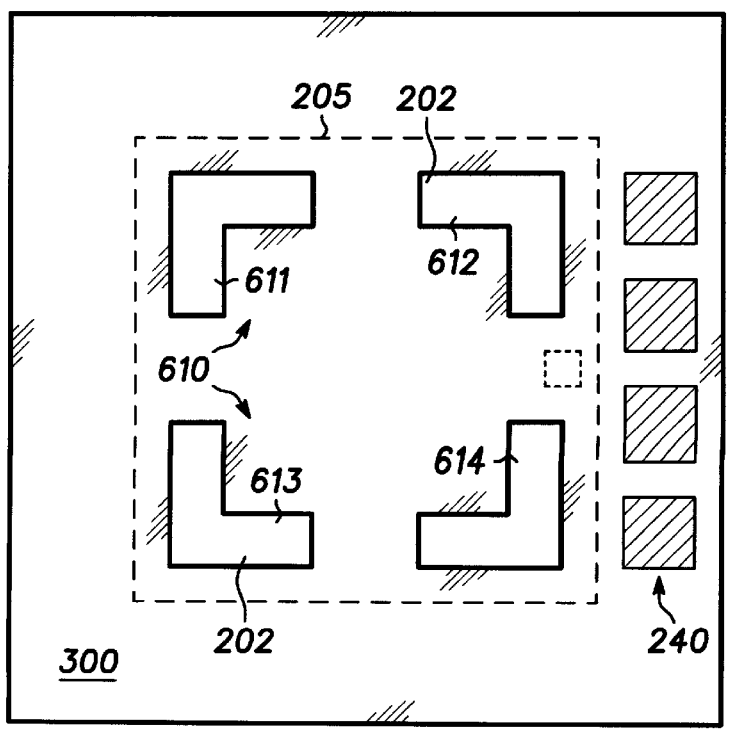
FIG. 6 illustrates a top view of a different embodiment of the electronic component in accordance with the present invention.
Figure 9:
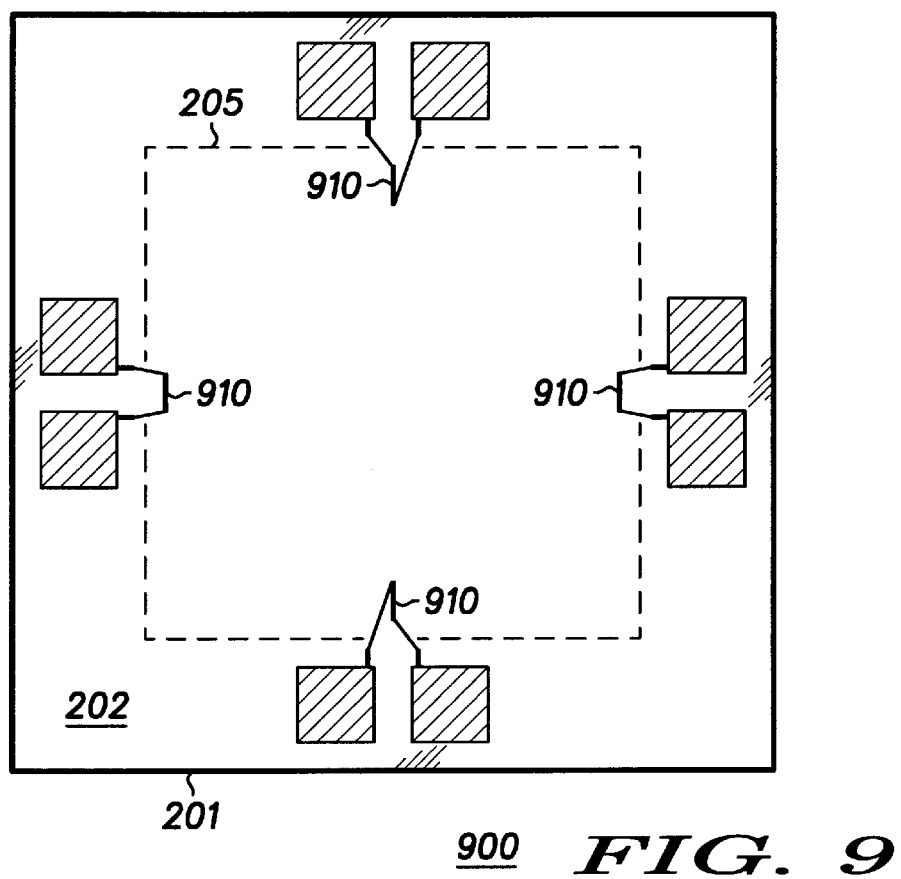
FIG. 9 illustrates a top view of a different embodiment of the electronic component in FIG. 2 in accordance with the present invention.

FIG. 6 illustrates a top view of an electronic component 600. Component 600 includes passivation layer 300 that has a pattern 610, which has a different configuration than pattern 310 of component 200 in FIG. 3. Pattern 610 has four holes 611, 612, 613, and 614, each of which are located adjacent to a different corner of the pressure sensor diaphragm. The piezoresistor of component 600 can have the localized Wheatstone Bridge configuration of resistor structure 210 in FIG. 2, or the piezoresistor of component 600 can have a distributed Wheatstone Bridge configuration, as illustrated in FIG. 9 hereinafter.

Figure 7:
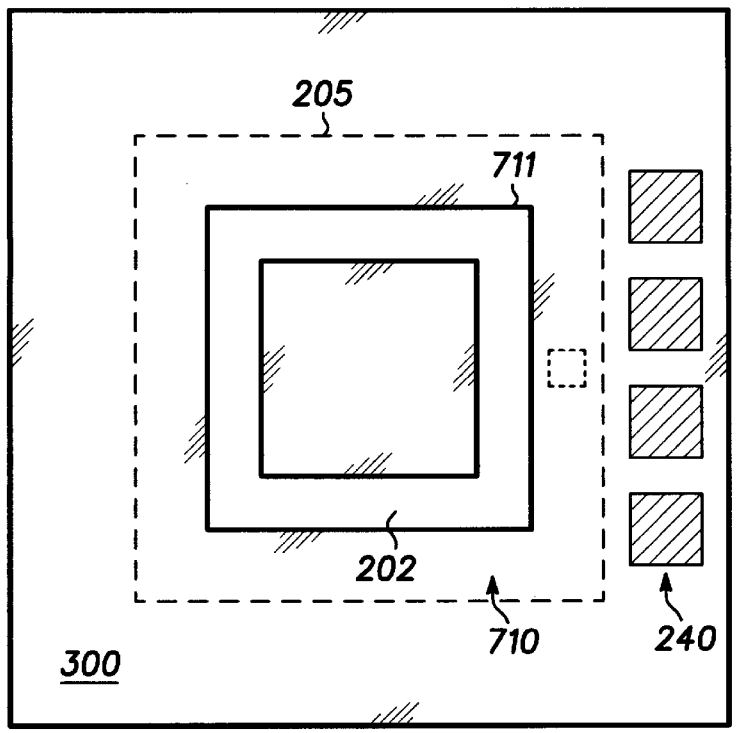
FIG. 7 illustrates a top view of a yet another embodiment of the electronic component in accordance with the present invention.

FIG. 7 illustrates a top view of an electronic component 700. Component 700 includes passivation layer 300 that has a pattern 710, which has a different configuration than pattern 310 of component 200 in FIG. 3. Unlike pattern 310, pattern 710 has a single hole 711, which separates layer 300 into at least two non-contiguous portions over the pressure sensor diaphragm. Similar to pattern 610 in FIG. 6, pattern 710 can be used with a localized Wheatstone Bridge configuration, as illustrated in FIG. 2, or a distributed Wheatstone Bridge configuration, as illustrated in FIG. 9 hereinafter.

Figure 8:
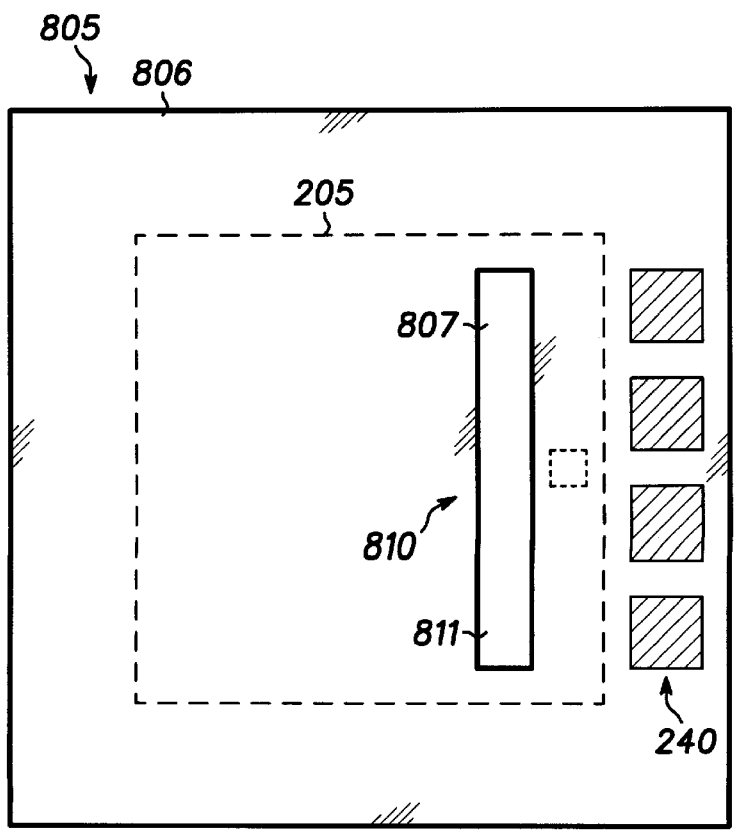
FIG. 8 illustrates a top view of a still another embodiment of the electronic component in accordance with the present invention.

FIG. 8 illustrates a top view of an electronic component 800. Component 800 includes a passivation layer 805 that is comprised of a plurality of individual layers. In the embodiment illustrated in FIG. 8, passivation layer 805 consists of two layers: an upper layer 806 and a lower layer 807. In this embodiment, layer 807 can be deposited over the surface of the substrate, and layer 806 can be deposited over layer 807. Layers 806 and 807 can be comprised of materials similar to those described for passivation layer 300 in FIG. 3, and layers 806 and 807 can be comprised of the same or different materials from each other.

As illustrated in FIG. 8, a pattern 810 can be formed or etched into upper layer 806 to expose a portion of layer 807. It is noted that pattern 810 is not symmetric over the center of the pressure sensor diaphragm, as in previous embodiments. Pattern 810 can be comprised of a single hole 811 that does not divide layer 806 into separate portions. The process of forming pattern 810 in layer 806 can easily keep layer 807 devoid of the pattern when layers 806 and 807 are comprised of different materials. When layers 806 and 807 are comprised of similar materials, pattern 810 can be easily formed into both layers 806 and 807. Pattern 810 is preferably used with resistor structure 210, as illustrated in FIG. 2.

FIG. 9 illustrates a top view of an electronic component 900, which depicts a distributed Wheatstone Bridge configuration. Component 900 is a different embodiment of electronic component 200 in FIG. 2. Component 900 has a resistor structure 910 that is positioned across surface 202 of substrate 201 in a non-localized or distributed Wheatstone Bridge configuration. In the distributed configuration, the four resistors in the Wheatstone Bridge are no longer located adjacent to the same edge of the pressure sensor diaphragm, as in a localized configuration. Instead, each of the four resistors in a distributed configuration are located adjacent to a different edge of the pressure sensor diaphragm. In this distributed configuration, one skilled in the art will recognize the need for additional bonding pads, as illustrated in FIG. 9. Component 900 preferably uses a passivation layer having a pattern similar to pattern 610 in FIG. 6 or pattern 710 in FIG. 7.

Therefore, an improved electronic component is provided to overcome the disadvantages of the prior art. The piezoresistive pressure sensor described herein has reduced sensitivity to thermal hysteresis errors and temperature coefficient of offset errors. This improvement can be accomplished by patterning the passivation layer into a particular configuration to control the deformation of the pressure sensor diaphragm and to locate the piezoresistor at a relatively stress-free location of the pressure sensor diaphragm. This improvement in reliability and electrical performance can be accomplished without significantly increasing the cost or complexity of the component.

All of the disclosed embodiments of the present invention described herein are enabled and can be realized and practiced without undue experimentation. Although the best mode of carrying out the present invention contemplated by the inventor is disclosed hereinabove, practice of the present invention is not limited thereto. Furthermore, while the present invention has been particularly shown and described mainly with reference to preferred embodiments, it will be understood by those skilled in the art that changes in form and detail may be made to the disclosure herein without departing from the spirit and scope of the present invention. For instance, the numerous details set forth herein such as, for example, the material compositions of the substrates and the passivation layers, the specific geometries of the passivation layer patterns and the pressure sensor diaphragm, and the dimensions of the diaphragm and holes in the passivation layer are provided to facilitate the understanding of the present invention and are not provided to limit the scope of the present invention.

Additionally, the pressure sensors described herein do not have to use a localized or distributed Wheatstone Bridge configuration, such as that illustrated for resistor structure 210 in FIG. 2 or resistor structure 910 in FIG. 9. Instead, as an example, a partially distributed Wheatstone Bridge configuration can be used in place of resistor structure 210 in FIGS. 2 and 3. In this embodiment, two of the four piezoresistors can be located at the right side of the diaphragm where resistor structure 210 is currently located in FIG. 3, and the remaining two piezoresistors can be located at the left side of the diaphragm, between holes 311 and 312, and directly opposite the first two piezoresistors. Furthermore, any appropriate two-terminal or four-terminal resistance measurement technique can be used in place of the Wheatstone Bridge configurations disclosed herein.

As another example, the various patterns described herein can be used with any of the single-layered or multi-layered passivation layers described herein. Furthermore, the patterns can be formed only into the bottom, middle, or top passivation layers, or the patterns can be formed into a plurality of the multi-layered passivation layers. In general, however, the passivation layer opening is preferably close to the location of the piezoresistor in order to achieve the desired deformation configuration of the pressure sensor membrane. Also, in general, the passivation layer preferably covers at least approximately 20–80 percent of the pressure sensor diaphragm. Additionally, the desired compressive and tensile portions of the pressure sensor diaphragm can be achieved by depositing passivation layers over both sides of the pressure sensor diaphragm and then patterning one or both of the layers.

As further examples, even when the passivation layer is comprised of a single layer, the pattern in the passivation layer does not have to be etched all the way through the passivation layer. Moreover, the passivation layer does not have to overlie the entire perimeter of the pressure sensor diaphragm. However, the passivation layer preferably remains over the portion of the perimeter that is adjacent to the piezoresistor in order to maximize the advantages described herein.

Accordingly, the disclosure of the present invention is not intended to be limiting. Instead, the disclosure of the present invention is intended to be illustrative of the scope of the present invention, which is set forth in the following claims. The appended claims are not to be interpreted as including means-plus-function limitations, unless such a limitation is expressly recited in a given claim using the phrase "means for."

What is claimed is:

1. A method of manufacturing an electronic component comprising:
   providing a substrate with a surface;
   providing a resistor supported by the substrate;
   depositing a passivation layer over the resistor and the surface of the substrate; and
   patterning the passivation layer to form at least one hole in the passivation layer,
   wherein the surface has a compressive portion and a tensile portion and wherein the resistor is located between the compressive and tensile portions of the surface.

2. The method of claim 1 wherein providing the substrate further comprises providing the substrate with a different surface opposite the surface, and
   wherein providing the resistor further comprises forming the resistor in the surface of the substrate, and
   further comprising etching a recess into the different surface of the substrate to form a diaphragm in the substrate wherein the recess is located under the resistor and the at least one hole in the passivation layer and wherein the resistor is located in the diaphragm and wherein the at least one hole in the passivation layer is located over the diaphragm.

3. The method of claim 2 further comprising forming interconnect lines in the surface of the substrate wherein the interconnect lines are electrically coupled to the resistor and wherein the interconnect lines are located in the diaphragm, and
   wherein depositing the passivation layer further comprises depositing the passivation layer over the interconnect lines.

4. The method of claim 3 wherein patterning the passivation layer further comprises keeping the passivation layer over the resistor and the interconnect lines.

5. The method of claim 1 further comprising forming a diaphragm in the substrate wherein an edge of the diaphragm is positioned under the passivation layer and is absent under the at least one hole.

6. The method of claim 5 wherein forming the diaphragm further comprises positioning the edge of the diaphragm adjacent to the resistor wherein the resistor is located over the diaphragm.

7. The method of claim 6 wherein patterning the passivation layer further comprises keeping the passivation layer over the resistor.

8. The method of claim 6 wherein forming the diaphragm further comprises positioning a central portion of the edge of the diaphragm adjacent to the resistor.

9. The method of claim 1 wherein depositing the passivation layer further comprises:
   depositing a first layer over the surface of the substrate; and
   depositing a second layer over the first layer, wherein the first and second layers are comprised of different materials.

10. The method of claim 9 wherein patterning the passivation layer further comprises:
    etching the second layer to form the at least one hole in the second layer; and
    keeping the first layer devoid of the at least one hole.

11. The method of claim 9 wherein patterning the passivation layer further comprises:
    etching the first layer to form the at least one hole in the first layer before depositing the second layer; and
    keeping the second layer devoid of the at least one hole.

12. The method of claim 1 wherein depositing the passivation layer further comprises physically contacting the passivation layer to the surface of the substrate.

13. The method of claim 1 wherein patterning the passivation layer further comprises exposing a portion of the surface through the at least one hole.

14. The method of claim 1 wherein patterning the passivation layer further comprises separating the passivation layer into at least two non-contiguous portions over the substrate.

15. The method of claim 1 wherein patterning the passivation layer further comprises keeping the passivation layer as one continuous layer over the substrate.

16. A method of manufacturing an electronic component comprising:
    forming a resistor in a substrate; and
    bending the substrate to form a compressive portion and a tensile portion wherein the resistor is located between the compressive and tensile portions of the substrate.

17. A method of manufacturing an electronic component comprising:
    providing a semiconductor substrate having first and second surfaces opposite each other;
    doping the semiconductor substrate to form a piezoresistor network and a first plurality of interconnect lines in the first surface of the semiconductor substrate, the first plurality of interconnect lines electrically coupled to the piezoresistor network;
    depositing a second plurality of interconnect lines over the first surface of the semiconductor substrate, the second plurality of interconnect lines electrically coupled to the first plurality of interconnect lines and comprised of a metal;
    depositing a dielectric layer over the first surface of the semiconductor substrate, the piezoresistor network, and the first and second plurality of interconnect lines;
    removing a portion of the dielectric layer to form a pattern comprised of at least one hole in the dielectric layer; and
    etching a cavity into the second surface of the semiconductor substrate to form a pressure sensor diaphragm in the semiconductor substrate after removing the portion of the dielectric layer wherein the piezoresistor network and the first plurality of interconnect lines are located in the pressure sensor diaphragm, wherein the first plurality of interconnect lines extend beyond the pressure sensor diaphragm, wherein the pattern in the dielectric layer is located over the pressure sensor diaphragm, and wherein the second plurality of interconnect lines are absent over the pressure sensor diaphragm.

18. The method of claim 17 wherein depositing the dielectric layer further comprises physically contacting the dielectric layer to the first surface of the semiconductor substrate, and wherein removing the portion of the dielectric layer further comprises:

exposing a portion of the first surface of the semiconductor substrate; and keeping the piezoresistor network and the first and second plurality of interconnect lines covered by the dielectric layer.

19. The method of claim 17 further comprising depositing an other dielectric layer over the dielectric layer, the first surface of the semiconductor substrate, the piezoresistor network, and the first and second interconnect lines after removing the portion of the dielectric layer.

20. The method of claim 17 wherein, after etching the cavity, the pressure sensor diaphragm has a tensile portion, a compressive portion, and a stress inflection portion located between the tensile and compressive portions wherein the piezoresistor network is located in the stress inflection portion of the pressure sensor diaphragm.

21. An electronic component comprising:

a substrate with a surface;

a resistor supported by the substrate; and a passivation layer over the resistor and the surface of the substrate wherein the passivation layer has a pattern comprised of at least one hole in the passivation layer, wherein the surface has a compressive portion and a tensile portion and wherein the resistor is located between the compressive and tensile portions of the surface.

* * * * *